J. C. BONNER.
RAILWAY FREIGHT TERMINAL AND SYSTEM.
APPLICATION FILED MAY 14, 1917.
1,280,144.  Patented Oct. 1, 1918.
4 SHEETS—SHEET 1.
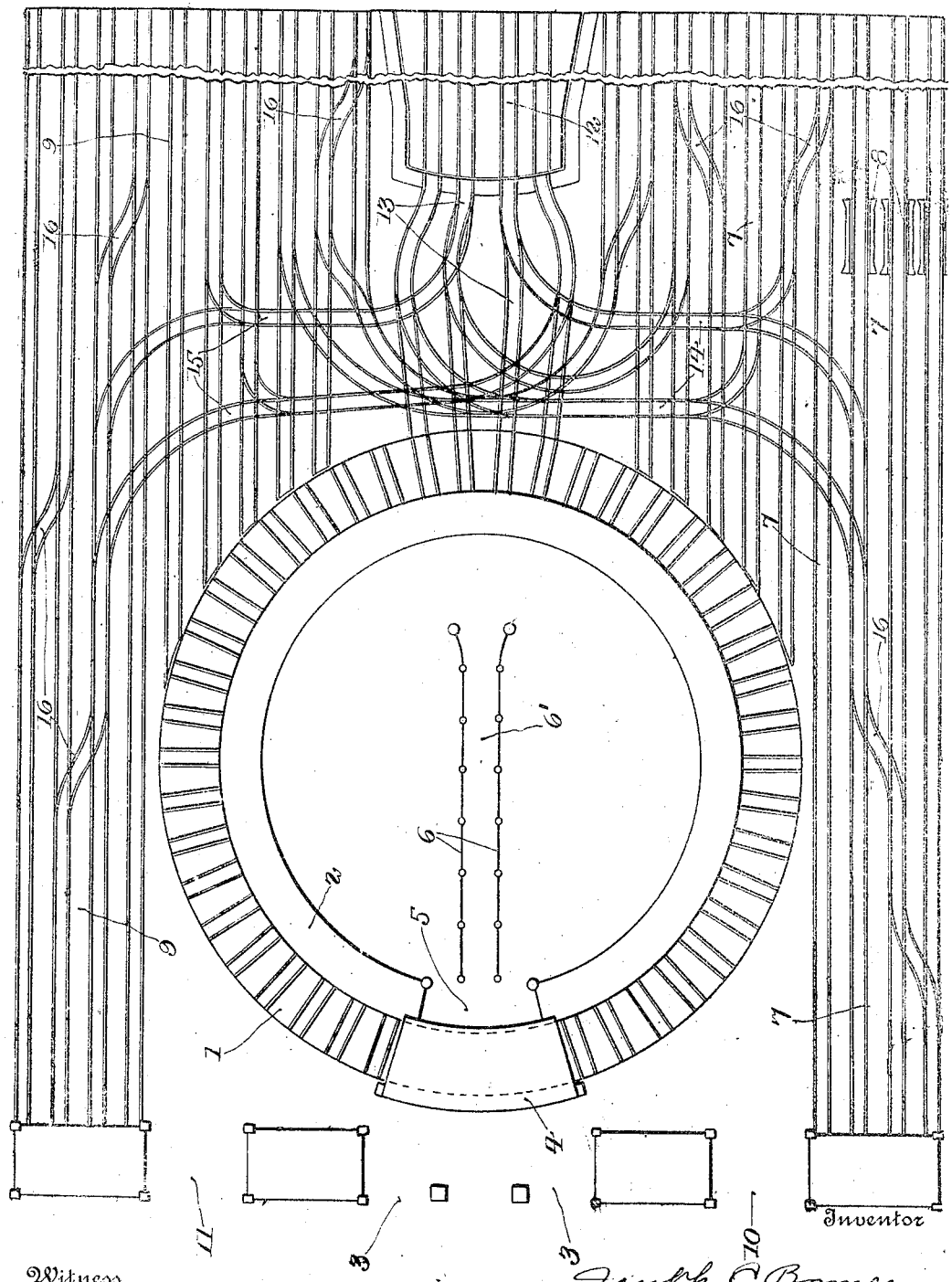

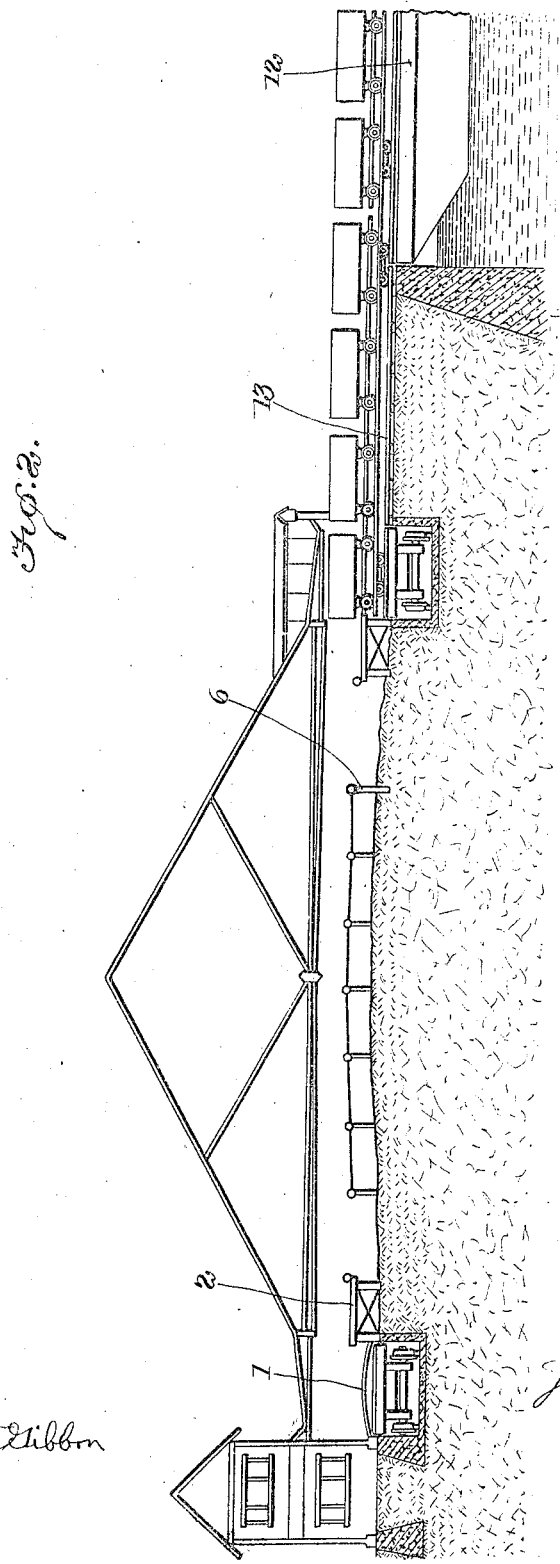

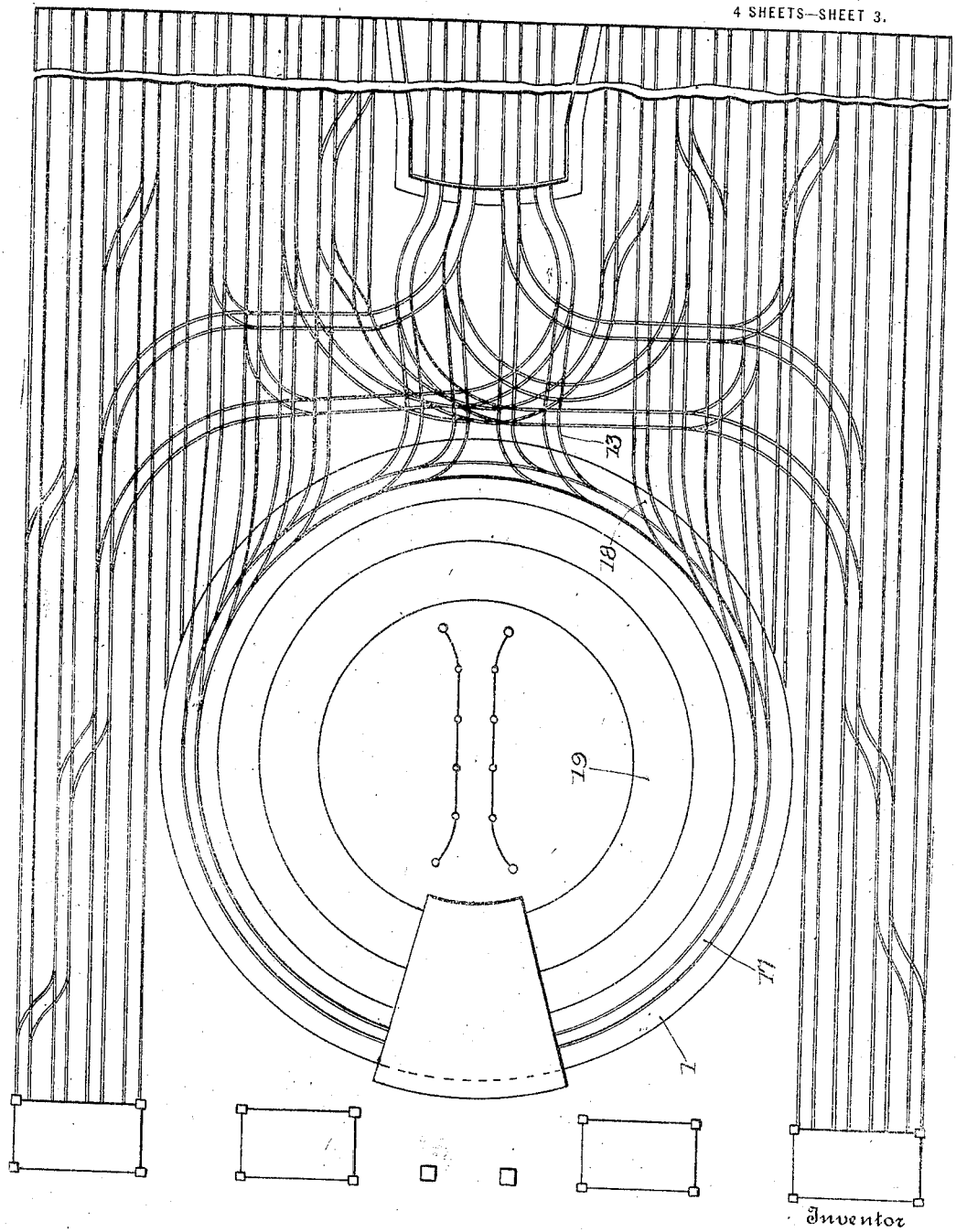

J. C. BONNER.
RAILWAY FREIGHT TERMINAL AND SYSTEM.
APPLICATION FILED MAY 14, 1917.
1,280,144.
Patented Oct. 1, 1918.
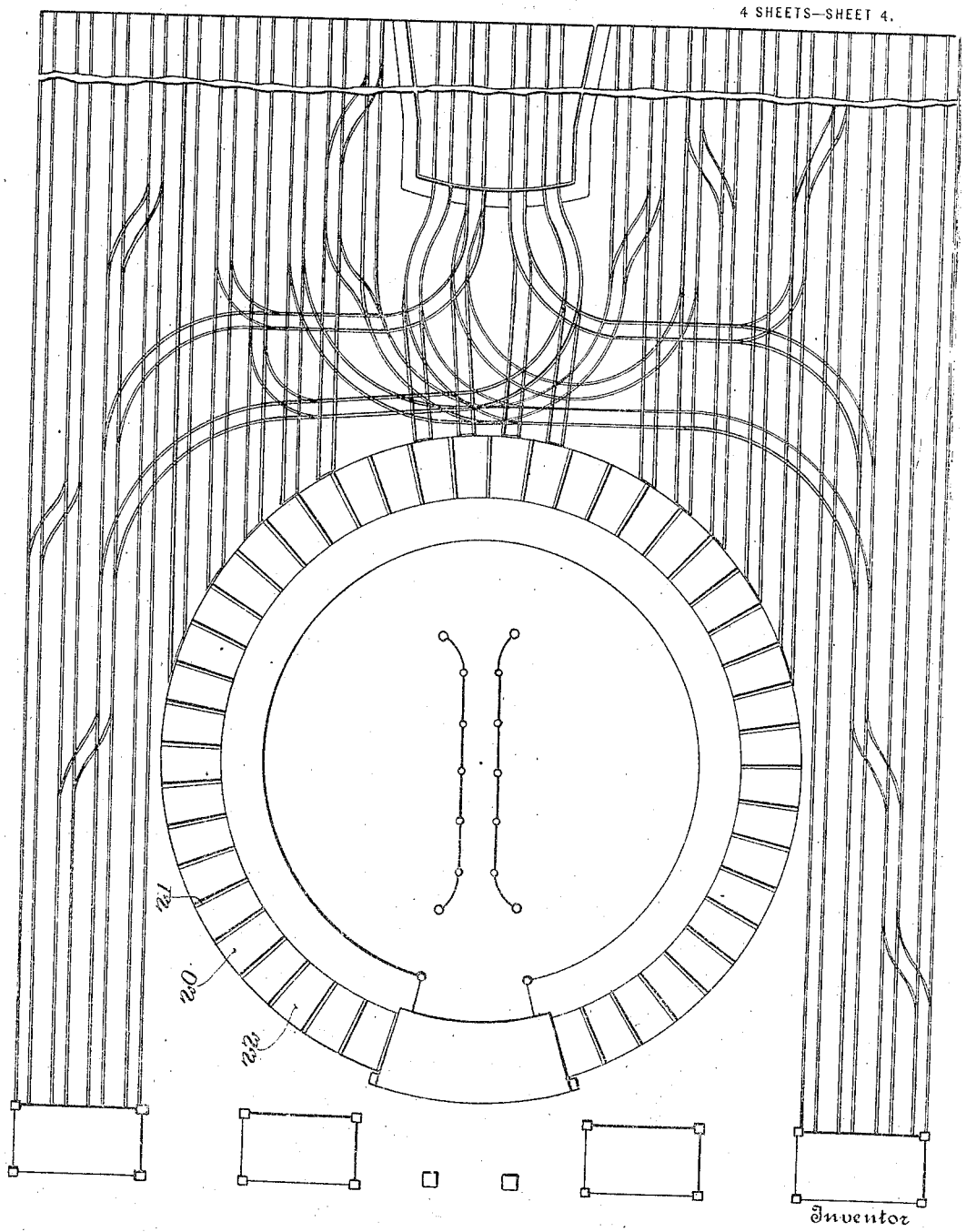

UNITED STATES PATENT OFFICE.

JOSEPH CLAYBAUGH BONNER, OF TOLEDO, OHIO.

RAILWAY FREIGHT TERMINAL AND SYSTEM.

1,280,144.   Specification of Letters Patent.   Patented Oct. 1, 1918.

Application filed May 14, 1917. Serial No. 168,577.

*To all whom it may concern:*

Be it known that I, JOSEPH C. BONNER, a citizen of the United States, residing at Toledo, in the county of Lucas and State of Ohio, have invented certain new and useful Improvements in Railway Freight Terminals and Systems, of which the following is a specification.

This invention relates to railway freight terminals and systems for simplifying the transfer of freight from auto trucks or other vehicles to freight cars. In the present invention, I employ wheeled vehicles which I term road wagons, in which the freight is loaded for transportation, the road wagons being adapted for mounting on freight cars by which they are carried to the destination of the freight, and there removed from the car. The combination railroad car and road wagons forms the subject matter of several of my copending applications, and for the purpose of explaining the present invention, it is merely necessary to state that the road wagons are capable of independent travel, being provided with steering means, and are constructed so as to permit them to be placed upon freight cars. In this invention, I provide means for handling freight conveyed from the warehouse to the terminal in these road wagons and means for transferring freight to road wagons when it has been conveyed to the terminals in ordinary vehicles, such as the ordinary type of auto trucks. The invention is also capable of being used for the purpose of loading and unloading the freight from the present type of freight cars and also in connection with the ordinary type of road vehicles.

In the present invention, I have devised a system for handling bulk freight, that is shipments wherein the entire load of a road wagon or truck or freight car is bound for the same destination, and also a further plan, which coöperates with the system mentioned, for the purpose of handling freight of the broken bulk type, by which I mean truck or wagon loads comprising several different consignments to different localities. Broadly the means for carrying out my invention comprises a stationary platform and means for positioning the wagons to be loaded or unloaded with respect to said platform. The means employed for positioning the wagons with respect to the platform is, in some instances, a turntable but under different conditions it may be advisable to employ other means for this purpose. Suitable inlets and exits are provided to allow vehicles to pass to and from the space within the platform without congestion or confusion. The freight is emptied upon the platform and is then transferred to the road wagons. At the rear of the turntable are a plurality of tracks and switches connecting to a series of tracks arranged on each side of the turntable, and to a car float arranged in a dock slip at the rear of the terminal, or to switches connecting with tracks of the mainline railways.

In another embodiment of the invention the turntable is employed, and is provided with circumferential tracks upon which an ordinary freight car may be positioned for loading and unloading.

Handling of freight in the large cities has developed into a serious problem, and large numbers of cars are delayed or "tied up" while waiting to have freight unloaded or to receive new consignments. At dock terminals (and also at land terminals) a great deal of this delay is attributed to the necessity, under present conditions, of unloading the contents of vehicles upon a platform, and conveying the material by hand trucks to the cars (or vice versa). This distance, in many instances in practice in cities, exceeds 1,000 feet. The platform space being limited, vehicles have to wait for an opportunity to obtain a place at the platform, or space upon which to unload, the hauling of freight upon hand trucks for a considerable distance being necessarily slow.

In the system which I have devised bulk truck loads, which are the major haulage, do not have to be re-handled at all, and I have materially simplified the handling of broken bulk loads, eliminating hauling of merchandise for any considerable distance by hand.

The terminals are numbered according to zones or stations to which the consignments are being sent and the trucks deliver the materials to the terminal corresponding in number to the zone or station in which the place of destination is located.

In carrying out this invention I provide a turnable or moving platform placed near the center of the freight terminal, and a stationary platform arranged within the turntable. The ends of the platform are spaced from each other to form entrances and exits for trucks or road wagons carrying broken bulk loads. The merchandise is deposited upon the platform, and transferred from the platform to the road wagons upon the turntable. A passage is provided to permit the trucks to leave the terminal in an orderly manner. At the rear of the turntable, or at any other point, a number of intersecting tracks and switches are arranged connecting to a series of parallel tracks or switches upon each side of the turntable, and to tracks leading to the car float, if it is a dock terminal, or to the main tracks in the case of a land terminal. The two series of parallel tracks are also connected with the main tracks, and are for the storage of freight cars carrying road wagons having consignments of bulk freight, one series handling outgoing loads, the other being a receiving station for bulk loads. An entrance to the terminal leads to each of the bulk receiving and discharging tracks. In some instances the turn table is eliminated and the wagons which receive the freight are suitably positioned about the platform. The wagons may be conveyed to their positions by means by a dinky engine or other suitable apparatus.

In the drawings I have shown, more or less diagrammatically, several embodiments of this invention, certain parts of which are omitted for clarity of presentation. In this showing—

Figure 1 is a plan view of the improved terminal;

Fig. 2 is a central longitudinal sectional view of the terminal shown in Fig. 1;

Fig. 3 is a plan view of another embodiment of the invention, and

Fig. 4 is a similar view of still another embodiment.

The turntable 1 is placed within the terminal and arranged within the same is a stationary platform 2. The turntable is of the ordinary type and is driven by any suitable means. At the front of the building entrances 3 are provided leading to a bridge or arch 4 in the flooring of the building which extends over the turntable and communicates with an opening 5 in a stationary platform. A lift or elevator (not shown) may be employed instead of the bridge 4. Within the platform there are arranged a plurality of partitions 6, forming driveway 6', which serves as an exit.

At one side of the building I arrange a series of storage tracks 7 provided with means, such as the alining switch 8 described in my copending application Serial No. 158,878, filed Mar. 31, 1917, for facilitating the storage and loading of rail wagons upon freight cars. At the opposite side of the building I provide a second series of storage tracks 9. Entrances 10 and 11 at the front of the building communicate with the storage tracks 7 and 9, respectively. The main tracks of the railroad or the car float (as the case may be) are indicated at 12 and are connected to the turntable by a series of connecting tracks 13. A second series of connecting tracks 14 are provided for connecting the storage tracks 7 and the car float 12, and a similar set of tracks 15 connects the storage tracks 9 and car float. Switches 16, placed in any desired positions, connect the adjacent storage tracks, and also connect with the turntable at any desired point.

In the embodiment shown in Fig. 3 of drawings, the invention is adapted to be employed in connection with ordinary freight cars and the turntable is provided with circumferential tracks 17 upon which the freight car is run from the tracks (13) by means of switches 18. If desired, a second turntable 19 may be placed within the stationary platform.

In the embodiment shown in Fig. 4 of the drawings, the turntable is eliminated and the space 20 surrounding the platform is divided by walls or partitions 21 forming the stalls 22.

The operation of the embodiment of my invention shown in Figs. 1 and 2 is as follows:—With reference to bulk loads carried by road wagons, the wagon enters the terminal at the entrance 10 and is lined upon one of the switches 8 and transferred to a freight car arranged upon the tracks 7. When a suitable number of cars have been loaded with road wagons or "made up" to form a train, the cars are transferred to the main tracks by means of the connecting tracks 14 and the train is carried to its destination. When a freight car enters the terminal it is carried over the tracks 15 to the storage tracks 9 which are employed as a discharge terminal. Any road wagons containing consignments for one destination are unloaded and passed from the terminal by means of the exit 11.

When the load of the road wagons is of the broken bulk type, or when the merchandise is loaded in any other type of vehicle, the vehicle enters the terminal through one of the entrances 3 passing over the bridge or clearance 4 and through the opening 5 into the center of the stationary platform. When an elevator or lift is employed in place of bridge 4, the outgoing and incoming wagons are lifted over the turntable. The bridge and elevator may both be eliminated and a clearance space maintained at the front of the turntable by proper positioning of the road wagons. The platform is divided into spaces designating different points of consignment and the vehicle unloads its merchandise at the proper points. A number of road wagons are placed upon the turntable and the freight is transferred from the stationary platform to the road wagons. The turntable is revolved at intervals and loaded road wagons are removed on the tracks 13 and carried on the tracks 14 to the storage tracks 7 by means of a dinky engine or other suitable power appliance and are there loaded on freight cars to be carried to their destination. When the road wagons stored upon tracks 9 contain different consignments of freight, similar means are employed for transferring the rail wagons to the turntable 1 by tracks 13 and 15. The freight can then be easily unloaded upon the stationary platform 2 and the trucks or other vehicles entering the inclosure receive the freight and carry it to its proper destination, or such freight may be reloaded onto road wagons that are on the turntables.

The partitions 6 arrange within the stationary platform form an exit through which the vehicles pass in leaving the building. The vehicles drive in on either side of the exit and when the contents have been transferred to the stationary table they drive to the rear and pass out.

The operation of the form shown in Fig. 3 of the drawings is very similar to that just described. The storage tracks and connecting tracks are used for the same purpose, and the freight car is driven onto the turntable 1, upon the track 17 by means of switches 18. In the ordinary type of freight car having a side door, the opening will then face the platform 2 and merchandise is removed and placed upon the platform. The vehicles which are to convey the merchandise to its destination enter the central space within the platform from bridge 4 and the merchandise is transferred from the platform to the vehicles. In some instances the road wagons to receive the merchandise are placed upon the second turntable 19, upon which they can be revolved to receive different consignments loaded at different points on the platform. The turntable 19 may be employed under some conditions, or it may be dispensed with.

The operation of the embodiment shown in Fig. 4, in which the turntable is not employed, is similar to the operation of the other forms, the road wagons being positioned within the stalls 22 to receive the freight from the platform and are moved from these stalls by means of dinky engines or other types of motor to the storage tracks.

In the claims wherever the phrase "main tracks" is employed, it is used to designate either the main tracks of a land terminal or the car float which enters a dock slip of a water terminal. It is to be understood that when a car float of this character has received a number of freight cars it is removed from the dock slip and replaced by another, the first car float then passing to other terminals upon the river where the cars are unloaded upon the tracks of the railroad, or other zone terminals of a large city, or neighboring towns having water communication.

What I claim is:—

1. A system for transferring freight comprising a stationary platform, and a movable platform arranged beside the stationary platform and adapted to receive merchandise-containing receptacles.

2. A railroad terminal comprising a stationary platform, means for positioning vehicles with respect thereto, storage tracks arranged near said platform and connecting tracks between the storage tracks and the vehicle positioning means.

3. In a system for handling freight, in combination, main tracks of a railroad, a stationary platform, means for positioning vehicles with respect to said platform, and a plurality of connecting tracks between said vehicle positioning means and the main tracks, whereby vehicles may be moved upon said main tracks from a plurality of points on said vehicle positioning means.

4. A railway terminal comprising a movable platform, a stationary platform adjacent the movable platform, a series of storage tracks, and tracks connecting the movable platform and storage tracks.

5. A railway terminal comprising a movable platform, a stationary platform adjacent the movable platform, a main series of tracks entering the terminal, and a series of intersecting tracks and switches connecting the movable platform with the main tracks of the railroad.

6. In a system for handling freight, in combination, a railroad track, storage tracks for receiving freight and storage tracks for discharging freight, and a plurality of tracks and switches connecting said storage tracks to the main tracks.

7. In a system for handling freight, in combination, main tracks of a railroad, a stationary platform, a movable platform and tracks connecting the movable platform to the main tracks.

8. In a system for handling freight, in combination, main tracks of a railroad, a turntable, a stationary platform within the turntable and tracks connecting the turntable with the main tracks.

9. In a system for handling freight, a turntable, a stationary platform within the turntable, a series of storage tracks arranged upon each side of the turntable and tracks connecting each series of storage tracks with the turntable.

10. In a system for handling freight, a turntable, a stationary platform, a series of receiving tracks, a series of discharge tracks and tracks connecting the receiving tracks and discharge tracks to the turntable.

11. In a system for handling freight, in combination with the main tracks of a railroad, a turntable, a stationary platform within the turntable, storage tracks arranged upon each side of the turntable, a series of tracks connecting said storage tracks to the turntable, and a series of tracks connecting the storage tracks to the main tracks.

12. In a system for handling freight, in combination with the main tracks of a railroad, a turntable, a stationary platform within the turntable, a series of storage tracks arranged upon each side of the turntable, a series of tracks connecting said storage tracks to the turntable and a series of tracks connecting the turntable to the main tracks.

13. In a system for handling freight, in combination with the main tracks of a railroad, a turntable, a stationary platform within the turntable, a series of storage tracks arranged upon each side of the turntable, a series of tracks connecting said storage tracks to the turntable, a series of tracks connecting the turntable to the main tracks and a series of tracks connecting the storage tracks to the main tracks.

14. A freight terminal comprising a turntable, a stationary platform within the turntable, partitions within the turntable forming passages for the entrance and exit of vehicles.

In testimony whereof, I affix my signature.

JOSEPH CLAYBAUGH BONNER.